Sept. 16, 1924.

J. A. PARRA

SPRING WHEEL

Filed Aug. 31, 1923        3 Sheets-Sheet 1

1,508,525

José A. Parra
INVENTOR

BY Victor J. Evans
ATTORNEY

WITNESS:

Sept. 16, 1924.

J. A. PARRA 1,508,525

SPRING WHEEL

Filed Aug. 31. 1923   3 Sheets-Sheet 2

Jose A. Parra
INVENTOR

BY Victor J. Evans
ATTORNEY

WITNESS:

Sept. 16, 1924.  J. A. PARRA  1,508,525
SPRING WHEEL
Filed Aug. 31. 1923   3 Sheets-Sheet 3
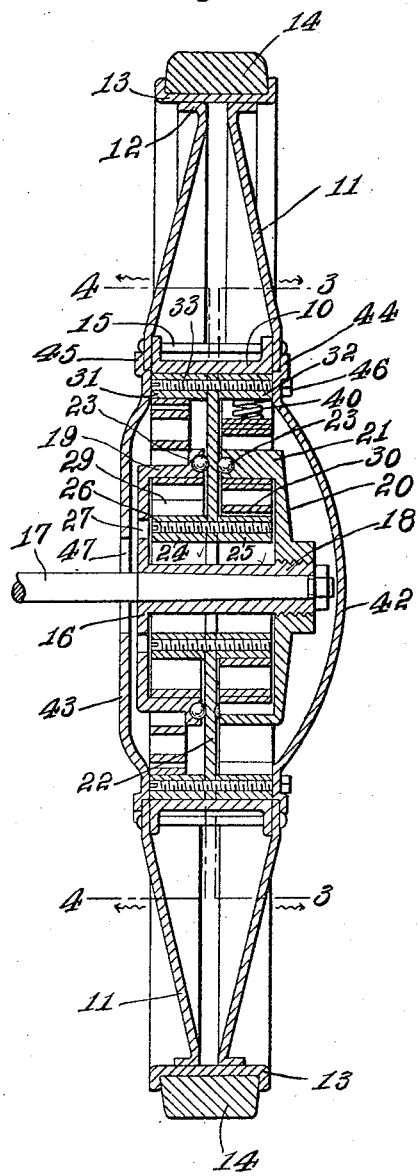
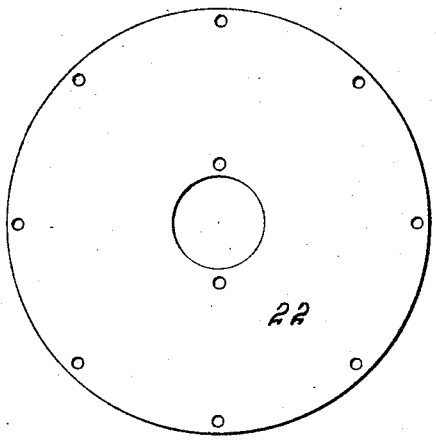
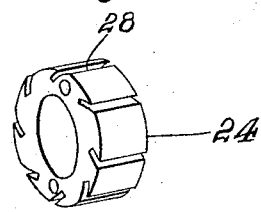
José A. Parra
INVENTOR
BY Victor J. Evans
ATTORNEY Patented Sept. 16, 1924.

1,508,525

UNITED STATES PATENT OFFICE.

JOSÉ ANGEL PARRA, OF EL PASO, TEXAS.

SPRING WHEEL.

Application filed August 31, 1923. Serial No. 660,420.

*To all whom it may concern:*

Be it known that I, José A. Parra, a citizen of Mexico, residing at El Paso, in the county of El Paso and State of Texas, have invented new and useful Improvements in Spring Wheels, of which the following is a specification.

This invention relates to vehicle wheels and has for its object the provision of a novel resilient wheel which is so constructed as to embody within itself the requisite elements to provide resilience and insure easy riding without it being necessary to employ the usual pneumatic tire, the device having the great advantage of being free from the troubles inherent to pneumatice tires such as punctures, blow outs and the like.

Another object is the provision of a wheel of this character which is so constructed as to provide the proper driving connection between the relatively stationary and the floating portions, the structure being moreover durable and well capable of withstanding all the shocks and jars incident to road travel even under the most strenuous conditions.

With the above and other objects and advantages in view the invention consists in the details of construction to be hereinafter more fully described and claimed and illustrated in the accompanying drawings, in which:

Figure 5 is a cross section through the complete wheel, Figure 6 is a detail elevation of a disk embodied in the device.

Figure 7 is a detail perspective view of one of the spring retainers.

Figure 1:
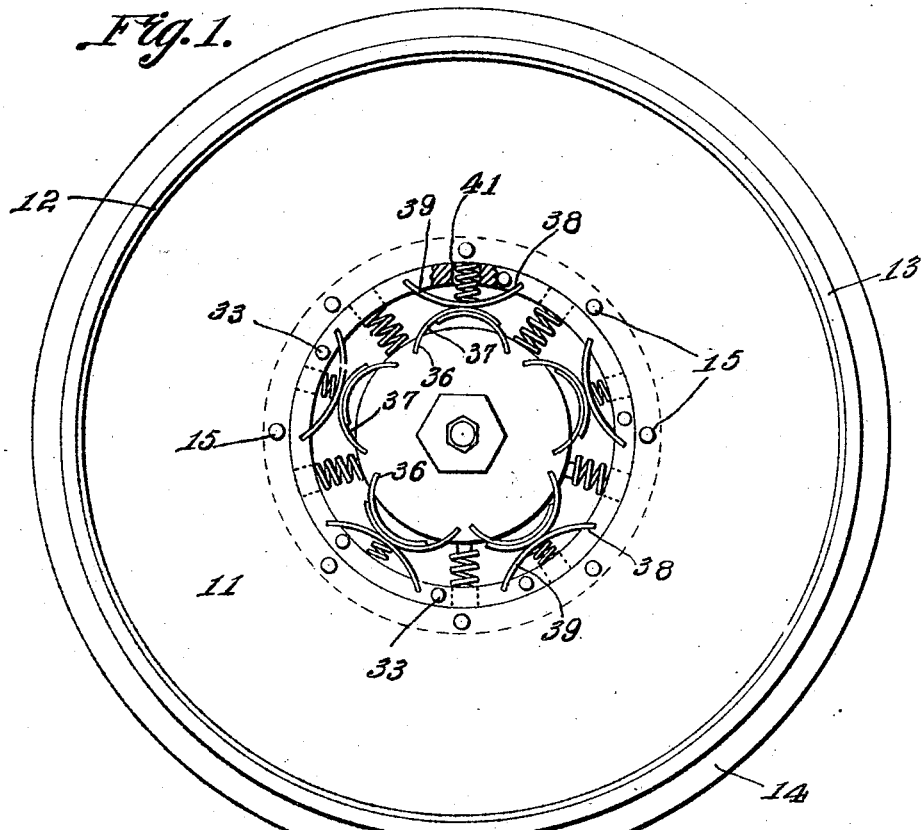
Figure 1 is an elevation of one side of the wheel with the cover plate removed.
Figure 3:
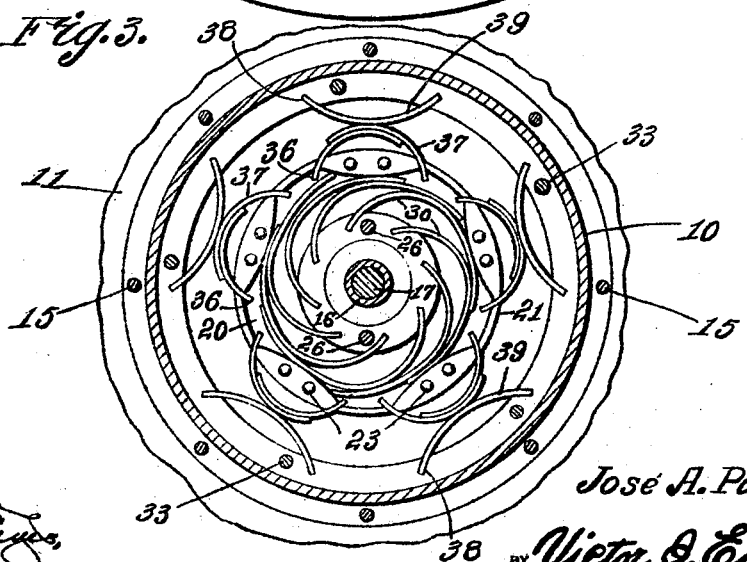
Figure 3 is a section on the line 3—3 of Figure 5.
Figure 2:
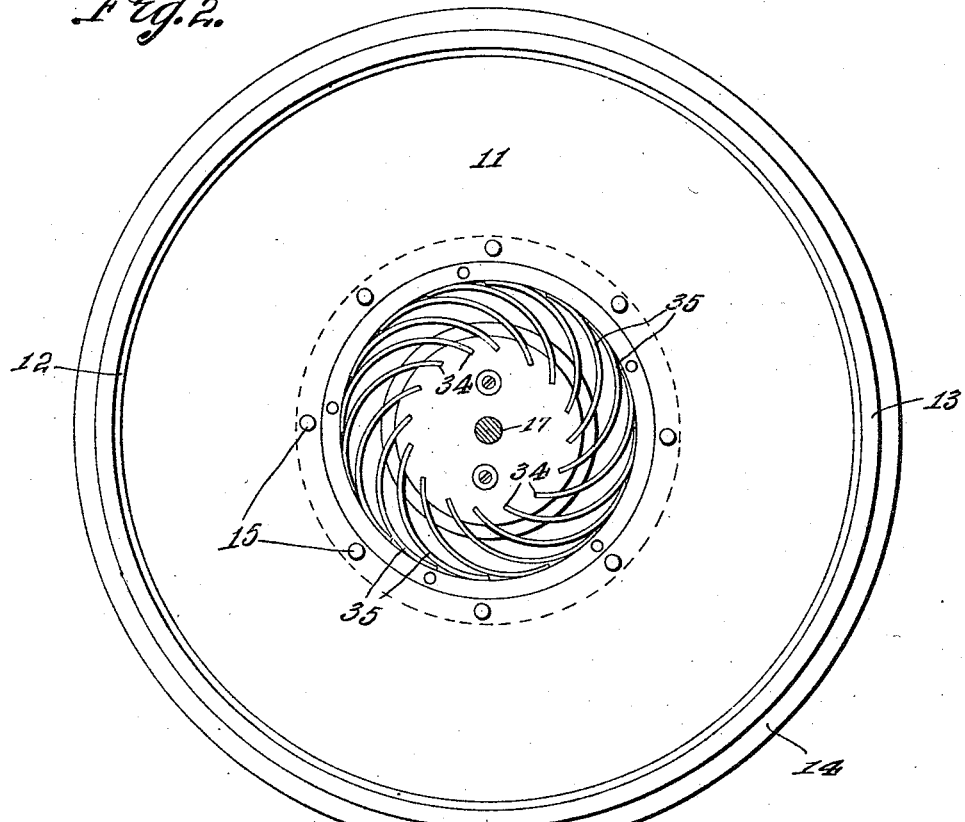
Figure 2 is an elevation of the opposite side with the cover plate thereof removed.
Figure 4:
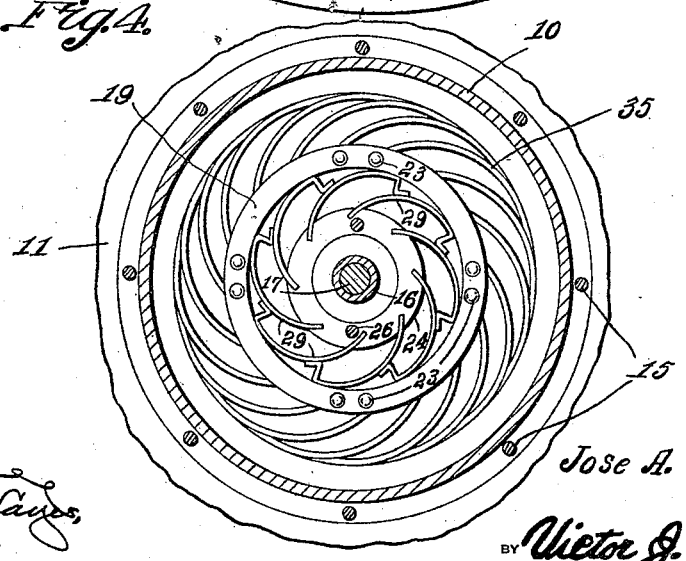
Figure 4 is a section on the line 4—4 of Figure 5.

Referring more particularly to the drawings I have shown my wheel as being of disk formation and including a ring 10 channel shaped in cross section and having secured to the flanges thereof outwardly converging disk members 11 which have their outer edges outturned as indicated at 12 to form flanges which carry the rim 13 on which is mounted a cushion or other tire 14. In some instances it might be possible to use a metal tire, but in no case is it contemplated that a pneumatic tire be used. The disk members 11 are shown as secured to the ring member 10 by means of bolts or rivets 15 though it should be understood that some other equivalent connection might be provided if preferred.

At the center of the wheel is a hub structure which includes a hub member 16 formed to receive and be secured upon a spindle or axle 17, in case of the rear wheel construction, or to be rotatable upon the spindle in case of front wheel construction. This detail is immaterial but it is of course to be understood that in case the wheel is built as a front wheel it must necessarily have incorporated therein some type of roller bearings, though such are not shown as forming any part of the present invention. This hub member 16 is of a somewhat cup like formation and includes a central sleeve portion 18 which engages the spindle and further includes an outer flanged portion 19. The hub structure further includes a second cup like member 20 which is screwed onto the free end of the sleeve 18 and which has an outer flanged portion 21 corresponding to and spaced from the flanged portion 19 of the hub member 16.

Located between the members 16 and 20 is a disk 22 and the flange members 19 and 21 have their confronting edges carrying anti-friction balls 23 which bear upon the opposite side of the disk 22 and which reduce the friction. Located at opposite sides of the disk 22 are rings 24 and 25 located within the hub members 16 and 20 respectively and secured to each other and to the disk 22 by grub screws 26. The hub member 16 is provided with holes 27 through which access may be had to these grub screws for effecting assembling or disassembling of the parts. The rings 24 and 25 are formed with notches or slots 28 and the notches in the ring 24 face in the opposite direction from those in the ring 25.

Located within the hub member 16 are curved springs 29 while located within the hub member 20 are similar curved springs 30 which however extended in the opposite direction to the springs 29. In both instances the springs have their inner ends engaged within the notches 28 of the ring members 24 and 25. The purpose of these oppositely disposed springs is to provide a drive connection between the two members constituting the hub structure while not interfering with the resilient action which is attained by the means to be described, whereby the wheel may be rotated in either direction without danger of distortion.

Located at the outer periphery of the disk 22 and at opposite sides thereof are rings 31 and 32 which are arranged concentrically of the hub members 16 and 20 respectively. These rings are secured with respect to each other and to the disk 22 by grub screws 33 which are readily accessible for assembling or disassembling purposes upon removal of one of the cover plates to be described. The outer periphery of the flange 19 of the hub member 16 is formed with slots 34 within which are engaged the inner ends of a series of curved leaf springs 35 which bear against the inner periphery of the ring 31. The flanged portion 21 of the hub member 20 is formed in its outer periphery with pairs of oppositely arranged slots 36 within which are engaged oppositely curved leaf springs 37 which have their free ends overlapping as shown. The inner periphery of the ring 32 is formed with pairs of oppositely inclined slots 38 within which are engaged the ends of leaf springs 39 which bear against the springs 37 as clearly shown in Figure 1. In addition to this feature I provide coil springs 40 which bear against the outer sides of the springs 39 and which are located within sockets 41 in the inner periphery of the ring 32. All the springs 35, 37 and 40 operate to provide resilience and permit the necessary movement between the hub portion and the outer portion of the wheel.

To exclude dust and dirt, and also water, I provide cover plates 42 and 43 for the opposite sides of the wheel, which cover plates close the space within the channel ring 10. The outer edges of these cover plates are offset as indicated at 44 and 45 so as to overlap the inner edges of the disk members 11. These cover plates are held in position by any suitable bolts or screws indicated at 46. To avoid interference with the spring action the plate 43 is formed with a central hole 47 of considerably greater diameter than the spindles 17.

From the foregoing description and a study of the drawings it will be apparent that I have thus provided a spring wheel of peculiar and novel formation in which there is ample provision for resilience while entirely obviating the use of a pneumatic tire to insure easy riding. The device is bound to be advantageous in use as it is not susceptible to punctures, blow outs or other ills inherent to pneumatic tires.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A spring wheel comprising a hub structure including a pair of sections of cup like formation secured together and adapted to be mounted upon a spindle, a drive connection between said sections, an outer wheel portion including a channeled ring carrying disks in turn carrying a rim, and a plurality of coil and leaf springs arranged in series between the hub structure and said channeled ring.

2. A spring wheel comprising a hub structure including a pair of sections of cup like formation secured together and adapted to be mounted upon a spindle, a drive connection between said sections, an outer wheel portion including a channeled ring carrying disks in turn carrying a rim, and a plurality of coil and leaf springs arranged in series between the hub structure and said channeled ring, said drive connection consisting of two series of curved leaf springs arranged to extend in opposite directions, rings within the hub members formed with slots, the inner ends of the last named springs fitting within said slots in the rings and the outer ends of the springs bearing against the inner periphery of the sections of the hub structure, said rings within the hub members being secured together.

3. In a spring wheel including an outer wheel portion, a hub structure and springs between the outer wheel portion and hub structure, the hub structure including two sections secured together and adapted to be mounted upon a spindle, and a drive connection between the two sections including two series of leaf springs, rings located within the sections of the hub structure, said last named springs being carried by said rings and bearing against the inner periphery of the outer portions of the hub members, the springs of one series being arranged oppositely to those of the other series, said rings within the hub members being secured together.

4. In a spring wheel, a hub structure including a pair of cup like members secured together and adapted to be mounted upon a spindle, a disk located between and rotatable with respect to said hub members, rings secured upon outer sides of said disk at the outer periphery thereof, a series of leaf springs carried by one hub section and bearing against the inner periphery of the corresponding ring, two series of leaf springs carried by the other hub section and arranged in overlapping relation, and coil springs recessed into the inner periphery of the other ring member and bearing against an additional set of leaf springs carried by the inner periphery of said second named ring member.

In testimony whereof I affix my signature.

JOSÉ ANGEL PARRA.